United States Patent
Patterson

(10) Patent No.: US 10,670,155 B2
(45) Date of Patent: Jun. 2, 2020

(54) LATCHING POPPET VALVE

(71) Applicant: Proserv Operations, Inc., Houston, TX (US)

(72) Inventor: Andy Patterson, Katy, TX (US)

(73) Assignee: PROSERV GILMORE VALVE LLC, Houston, TX (US)

( * ) Notice: Subject to any disclaimer, the term of this patent is extended or adjusted under 35 U.S.C. 154(b) by 244 days.

(21) Appl. No.: 15/264,253

(22) Filed: Sep. 13, 2016

(65) Prior Publication Data

US 2017/0097100 A1   Apr. 6, 2017

Related U.S. Application Data

(60) Provisional application No. 62/237,316, filed on Oct. 5, 2015.

(51) Int. Cl.
*F16K 31/12* (2006.01)
*F16K 11/07* (2006.01)
(Continued)

(52) U.S. Cl.
CPC .......... *F16K 11/0712* (2013.01); *E21B 34/16* (2013.01); *F16K 11/048* (2013.01);
(Continued)

(58) Field of Classification Search
CPC ....... Y10T 137/8667; Y10T 137/86678; Y10T 137/86686; Y10T 137/86887; Y10T 137/86895; Y10T 137/8663; Y10T 137/86694; Y10T 137/8671; Y10T 137/87885; F15B 13/0402; F15B 13/0405; F15B 13/028; F15B 2211/3052; E21B 34/16; F16K 11/048; F16K 31/122; F16K 1/38; F16K 11/0712; F16K 31/1225; F16K 31/1245
(Continued)

(56) References Cited

U.S. PATENT DOCUMENTS

| 402,600 A | 5/1889 | Kemp |
| 1,654,642 A | 1/1928 | Geissinger |

(Continued)

FOREIGN PATENT DOCUMENTS

| CH | 469928 A | 3/1969 |
| DE | 102014224979 A1 | 6/2016 |

OTHER PUBLICATIONS

PCT International Search Report and Written Opinion dated Dec. 1, 2017, for International Application No. PCT/US2017/061567.
(Continued)

*Primary Examiner* — Craig J Price
(74) *Attorney, Agent, or Firm* — Patterson + Sheridan, LLP

(57) ABSTRACT

A directional control valve for selectively communicating a valve outlet to one of a vent port and a pressure supply port includes a poppet extending through a cage. Relative positioning of the poppet to the cage selects which of the vent and pressure supply port is communicated to the valve outlet. The poppet position relative to the cage is provided by supplying fluid pressure to one of the opposed sides thereof, and the poppet latches with the cage so that the fluid pressure on one of the sides of the poppet need not be maintained to maintain the poppet position in the valve.

15 Claims, 7 Drawing Sheets

(51) Int. Cl.
*F16K 31/122* (2006.01)
*E21B 34/16* (2006.01)
*F16K 11/048* (2006.01)
*F16K 31/124* (2006.01)

(52) U.S. Cl.
CPC ........ *F16K 31/122* (2013.01); *F16K 31/1225* (2013.01); *F16K 31/1245* (2013.01); *Y10T 137/8667* (2015.04); *Y10T 137/8671* (2015.04)

(58) Field of Classification Search
USPC ............ 137/625.66, 625.69, 625.27, 625.26, 137/625.25, 512.1, 513, 625.36, 625.37
See application file for complete search history.

(56) References Cited

U.S. PATENT DOCUMENTS

| | | |
|---|---|---|
| 2,140,735 A | 12/1938 | Gross |
| 2,311,851 A | 2/1943 | McClure |
| 2,560,841 A | 7/1951 | Bishop |
| 2,605,108 A | 7/1952 | Stephens |
| 2,685,296 A | 8/1954 | Boosman |
| 2,729,226 A | 1/1956 | Jones |
| 2,799,523 A | 7/1957 | Parker |
| 2,811,979 A | 11/1957 | Presnell |
| 2,821,972 A | 2/1958 | Banker |
| 2,847,027 A | 8/1958 | Kumpman |
| 2,862,520 A | 12/1958 | Cordova |
| 2,867,463 A | 1/1959 | Snider |
| 2,892,644 A | 6/1959 | Collins |
| 2,906,290 A | 9/1959 | Harding et al. |
| 2,973,746 A | 3/1961 | Jupa |
| 3,022,794 A | 2/1962 | Pippenger |
| 3,114,391 A | 12/1963 | Kurtz |
| 3,145,723 A | 8/1964 | Chorkey |
| 3,189,049 A | 6/1965 | Carlson |
| 3,225,786 A | 12/1965 | Elliott |
| 3,316,930 A * | 5/1967 | Garduer ............... F15B 13/0431 137/270 |
| 3,352,394 A | 11/1967 | Longshore |
| 3,421,533 A | 1/1969 | Conn |
| 3,474,828 A | 10/1969 | Wheeler et al. |
| 3,485,225 A | 12/1969 | Bailey et al. |
| 3,533,431 A | 10/1970 | Kuenzel et al. |
| 3,536,085 A * | 10/1970 | Taplin ................. F15B 13/0402 137/625.66 |
| 3,540,695 A | 11/1970 | Taylor |
| 3,587,647 A | 6/1971 | Walters |
| 3,598,148 A * | 8/1971 | Kroffke ............... F15B 13/0405 137/596.16 |
| 3,635,436 A | 1/1972 | Tillman |
| 3,662,950 A | 5/1972 | McIntosh et al. |
| 3,683,694 A | 8/1972 | Granberg |
| 3,749,122 A | 7/1973 | Gold |
| 3,797,525 A | 3/1974 | Lieser |
| 3,913,620 A * | 10/1975 | Pauliukonis .......... F16K 31/363 137/625.27 |
| 3,949,645 A | 4/1976 | Masclet |
| 4,220,174 A | 9/1980 | Spitz |
| 4,240,634 A | 12/1980 | Wiczer |
| 4,253,481 A | 3/1981 | Sarlls, Jr. |
| 4,263,938 A | 4/1981 | Peters |
| 4,281,677 A | 8/1981 | Hoffman |
| 4,336,946 A | 6/1982 | Wheeler |
| 4,396,071 A | 8/1983 | Stephens |
| 4,444,216 A | 4/1984 | Loup |
| 4,475,568 A | 10/1984 | Loup |
| 4,491,154 A | 1/1985 | Peters |
| 4,493,335 A | 1/1985 | Watson |
| 4,554,940 A | 11/1985 | Loup |
| 4,793,590 A | 12/1988 | Watson |
| 4,856,557 A | 8/1989 | Watson |
| 4,877,057 A | 10/1989 | Christensen |
| 4,890,645 A | 1/1990 | Andersen |
| 4,968,197 A | 11/1990 | Chen |
| 5,035,265 A | 7/1991 | Chen |
| 5,069,240 A | 12/1991 | Kurkjian, Jr. |
| 5,190,078 A | 3/1993 | Stoll et al. |
| 5,222,521 A * | 6/1993 | Kihlberg ............... F16K 27/041 137/625.66 |
| 5,301,637 A | 4/1994 | Blount |
| 5,771,931 A | 6/1998 | Watson |
| 5,797,431 A | 8/1998 | Adams |
| 5,901,749 A | 5/1999 | Watson |
| 6,041,804 A | 3/2000 | Chatufale |
| 6,257,268 B1 | 7/2001 | Hope et al. |
| 6,264,206 B1 | 7/2001 | Hashizawa et al. |
| 6,296,008 B1 | 10/2001 | Boyer et al. |
| 6,318,400 B1 | 11/2001 | Hope et al. |
| 6,382,256 B2 | 5/2002 | Kim et al. |
| 6,422,531 B1 * | 7/2002 | Sich ...................... B60T 13/665 137/596.18 |
| 6,520,478 B1 | 2/2003 | Hope et al. |
| 6,523,613 B2 | 2/2003 | Rayssiguier et al. |
| 6,651,696 B2 | 11/2003 | Hope et al. |
| 6,668,861 B2 * | 12/2003 | Williams ............ F15B 13/0405 137/625.27 |
| 6,702,024 B2 | 3/2004 | Neugebauer |
| 6,843,266 B2 | 1/2005 | Hope et al. |
| 6,901,960 B2 * | 6/2005 | Roberts ............... F04B 43/0736 137/625.66 |
| 6,983,803 B2 | 1/2006 | Watson et al. |
| 7,000,890 B2 | 2/2006 | Bell et al. |
| 7,073,590 B2 | 7/2006 | Neugebauer et al. |
| 7,159,605 B2 | 1/2007 | Thrash, Jr. et al. |
| 7,438,086 B2 * | 10/2008 | Bento .................. F15B 20/001 137/596.16 |
| 7,520,297 B2 | 4/2009 | Bell et al. |
| 7,628,170 B2 | 12/2009 | Kok-Hiong et al. |
| 7,784,553 B2 | 8/2010 | Moreno |
| 7,959,161 B2 | 6/2011 | Seki et al. |
| 8,052,119 B2 | 11/2011 | Numazaki et al. |
| 8,245,729 B2 * | 8/2012 | Zub ..................... F15B 13/0402 137/625.66 |
| 8,246,055 B2 | 8/2012 | Asplund et al. |
| 8,342,202 B2 | 1/2013 | Nishio et al. |
| 8,397,742 B2 | 3/2013 | Thrash et al. |
| 8,408,244 B2 | 4/2013 | Gilcher |
| 8,453,678 B2 * | 6/2013 | Neff ...................... F16K 11/07 137/625.64 |
| 8,469,059 B1 | 6/2013 | Forst |
| 8,474,792 B2 | 7/2013 | Kubo et al. |
| 9,121,244 B2 | 9/2015 | Loretz et al. |
| 9,297,462 B2 | 3/2016 | Hattori et al. |
| 9,334,946 B1 | 5/2016 | Mason |
| 9,354,638 B2 * | 5/2016 | Rebreanu ................. F16K 1/00 |
| 9,423,031 B2 | 8/2016 | Weintraub et al. |
| 9,869,400 B2 * | 1/2018 | Schulz .................. F15B 1/027 |
| 9,874,282 B2 | 1/2018 | Wetzel et al. |
| 2004/0047748 A1 * | 3/2004 | Roberts ............... F04B 43/0736 417/395 |
| 2004/0173976 A1 | 9/2004 | Boggs |
| 2004/0262007 A1 | 12/2004 | Neugebauer et al. |
| 2005/0028864 A1 | 2/2005 | Thrash et al. |
| 2005/0067031 A1 * | 3/2005 | Lee ..................... F15B 13/0402 137/625.69 |
| 2006/0137744 A1 | 6/2006 | Anastas |
| 2006/0237064 A1 | 10/2006 | Benson |
| 2007/0000544 A1 | 1/2007 | Thompson |
| 2007/0069576 A1 | 3/2007 | Suzuki |
| 2007/0113906 A1 | 5/2007 | Sturman et al. |
| 2010/0044605 A1 | 2/2010 | Veilleux |
| 2010/0140881 A1 | 6/2010 | Matsuo |
| 2010/0154896 A1 | 6/2010 | Thrash, Jr. et al. |
| 2010/0243084 A1 | 9/2010 | Yoshioka et al. |
| 2011/0253240 A1 | 10/2011 | Otto et al. |
| 2012/0292550 A1 | 11/2012 | Meek |
| 2013/0032222 A1 | 2/2013 | Bresnahan |
| 2013/0037736 A1 | 2/2013 | Bresnahan |
| 2013/0146303 A1 | 6/2013 | Gustafson |
| 2013/0181154 A1 | 7/2013 | Robison et al. |
| 2014/0116551 A1 | 5/2014 | Smith |
| 2014/0377111 A1 | 12/2014 | Bagagli et al. |

(56) References Cited

U.S. PATENT DOCUMENTS

| | | |
|---|---|---|
| 2015/0060715 A1 | 3/2015 | Hoang |
| 2015/0152959 A1 | 6/2015 | Mangiagli et al. |
| 2015/0191996 A1 | 7/2015 | Weintraub |
| 2015/0191997 A1 | 7/2015 | Weintraub et al. |
| 2015/0276072 A1* | 10/2015 | Rebreanu ............... F16K 1/00 137/512.5 |
| 2015/0276083 A1 | 10/2015 | Druhan et al. |
| 2015/0369002 A1 | 12/2015 | Patterson |
| 2016/0103456 A1 | 4/2016 | Cho et al. |
| 2016/0123478 A1 | 5/2016 | Wetzel et al. |
| 2016/0230900 A1* | 8/2016 | Schulz ................... F15B 1/027 |
| 2016/0258531 A1 | 9/2016 | Ito et al. |
| 2016/0258537 A1 | 9/2016 | Heiderman et al. |
| 2017/0037984 A1 | 2/2017 | Frippiat et al. |
| 2017/0097100 A1 | 4/2017 | Patterson |
| 2017/0175916 A1 | 6/2017 | Huynh et al. |
| 2017/0189730 A1 | 7/2017 | Ernfjall |
| 2017/0220054 A1 | 8/2017 | Zhu et al. |
| 2017/0241563 A1 | 8/2017 | Simpson |
| 2017/0260831 A1 | 9/2017 | Green |
| 2017/0314689 A1 | 11/2017 | Osterbrink et al. |
| 2017/0370481 A1 | 12/2017 | Glazewski |
| 2018/0073652 A1 | 3/2018 | Weintraub |

OTHER PUBLICATIONS

PCT International Search Report and Written Opinion dated Jan. 31, 2018, for International Application No. PCT/US2017/051550.

PCT International Search Report and Written Opinion dated Jun. 23, 2015, for International Application No. PCT/US2014/062114.

PCT International Search Report and Written Opinion dated Nov. 14, 2019, for International Application No. PCT/US2019/046323, 13 pages.

* cited by examiner

LATCHING POPPET VALVE

BACKGROUND

Field of the Invention

The present disclosure relates to the field of fluid based operation and control of devices. More particularly, the disclosure relates to directional control valves used to selectively provide, or block, the supply and communication of pressurized fluid therethrough.

Background of the Art

In recent years the oilfield valve industry has developed a need for a more simple and reliable high flow/high pressure 3-way 2-position hydraulic directional control valve. For several decades now, sub-plate mounted valves, or SPM (Sub-plate mounted) valves, such as those shown in U.S. Pat. Nos. 4,457,489, 5,771,993 or 5,778,918 have been used to control high flows and high pressures used in hydraulic BOP control systems. However, increased requirements for operating pressures and flow rates, to and from blowout preventers (BOP) rams and critical valve cylinders, needed to meet new regulations for reduced operating times, have resulted in reduced mean time between failure (MTBF) for traditional SPM valves.

Traditional SPM spring return valve designs require that hydraulic pilot pressure be maintained "ON" to maintain the piloted valve in the operating position such that pressurized fluid therein can communicate with the downstream device. When there are dozens of (or more) hydraulically piloted SPM valves used in BOP control systems, the need to maintain pilot pressure "ON" in a large number of valves can also adversely affect the reliability of the hydraulic pilot control circuits, and also increase the volume of pressurized fluid maintained for use in the case of a need to operate the hydraulic BOP control system or other hydraulically controlled or operated component, thus increasing the costs of operation and the risk of a leak or other service interruption.

The industry thus requires a new high flow/pressure 3-way hydraulic directional control valve with improved failure rates (improved MBTF), where the valve also remains in the last valve position, i.e., open or closed, without the need to maintain pilot pressure "ON", thereby reducing the number of valve cycles in the life of the valve and reducing the reserve pressurized fluid volumes required for system operation.

SUMMARY

There is provided a hydraulic three way directional control valve in which the valve, in the unpressurized state, may be maintained in an open or closed position, to selectively supply pressurized fluid to a downstream component, or to vent pressurized fluid from the downstream component, without the need to maintain closing or opening hydraulic fluid under pressure to the valve. In this case, when the high pressure fluid supply is being directed through the valve to a functional outlet for operation or control of a downstream device the valve is in the "open" or "ON" state, and when the high pressure fluid supply is being sealed off by the valve from the functional outlet the valve is in the "closed" or "OFF" state.

The valve hereof includes a body having a first pilot inlet and a second pilot inlet, with a movable valve poppet disposed therebetween. The body also includes a vent outlet, a functional outlet which is configured to be fluidly connected to a downstream component, and a source pressure inlet. Pressures at the first and second pilot inlets control the position of the valve poppet in the body, and thus the communication of pressure and fluid between the source pressure inlet and the functional outlet, and between the functional outlet and the vent outlet. In operation, when pressure at the second pilot inlet sufficiently exceeds that at the first pilot inlet, the poppet moves to close off the source pressure inlet and allows communication between the vent outlet and the functional outlet. When the fluid pressure on the first pilot inlet is sufficient relative to that on the second pilot inlet, the valve poppet moves to close off the vent outlet, such that fluid at the source inlet is free to communicate between the source inlet and the functional outlet, and the functional outlet and vent are sealed off from one another. To latch the poppet in one of the functional outlet-to-vent and supply inlet-to-functional outlet flow path condition, the relative diameters of the sealing surface of the poppet to the interior sealing surface of the valve, and the diameter of opposed pilot pistons, which face either the supply pressure or the vent pressure, causes a sealing surface of the poppet to be biased against a complimentary sealing surface of the valve.

The valve includes a cage, in the body of the valve, through which the poppet extends. The cage includes a pair of opposed frustoconical sealing faces, each of which is engageable with a conical sealing face on the poppet. The poppet, and the sealing faces, are sized and arranged such that the force acting against the sealing face of the cage is approximately twice the pressure applied to an end of the poppet. The poppet thus remains in the last position it was biased by pilot pressure without the need to maintain a control pressure on the valve pilot inlets to position the poppet.

DESCRIPTION OF THE EMBODIMENTS

Figure 1:
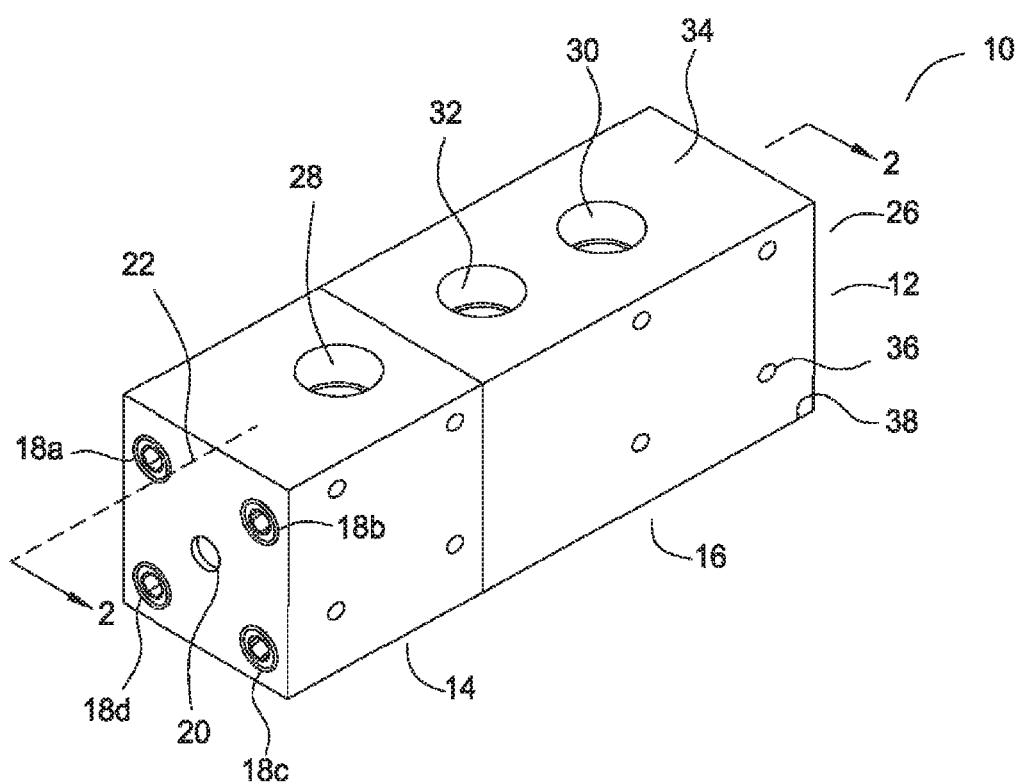
FIG. 1 is a perspective view of a valve of the present invention.
Figure 2:
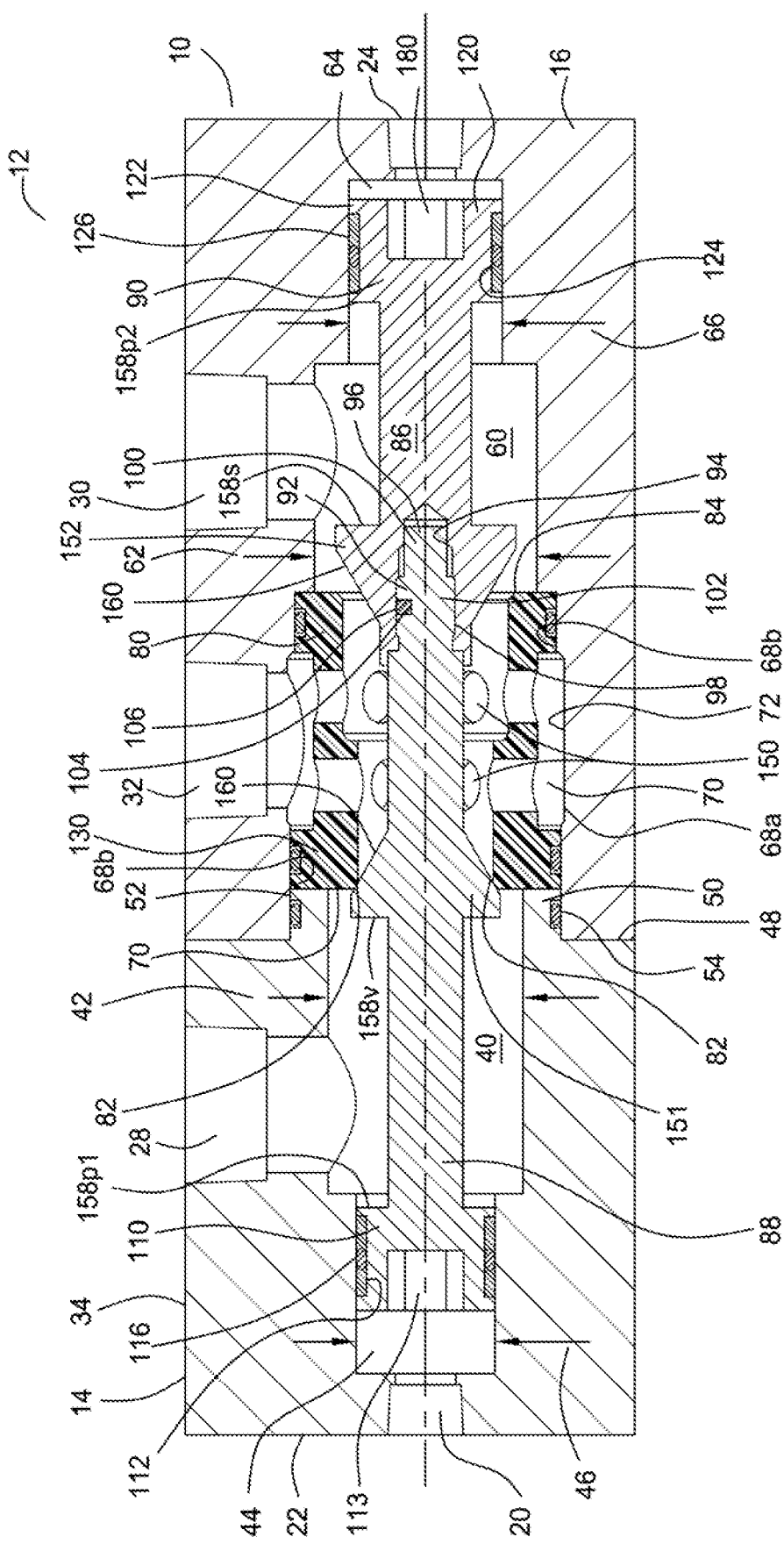
FIG. 2 is a sectional view of the valve of FIG. 1, with the valve in the "ON" position.

Referring now to FIG. 1, the exterior of the latching poppet valve 10 is shown in perspective. The valve 10 includes a valve body 12 configured as a rectangular prism, although other geometries such as a cylinder or other sectional geometry may be used. Body 12 includes a first housing 14 and a second housing 16, which are bolted together by extending fasteners 18a-d through holes (not shown) extending through first housing and into corresponding threaded holes (not shown) aligned therewith in the second housing 16. First housing 14 includes a first inlet 20 (first pilot inlet) extending inwardly thereof at first end face 22, and a vent port 28 extending inwardly of a first adjacent side face of the rectangular prism. Second housing 16 includes a second inlet 24 (second pilot inlet shown in FIG. 2) extending inwardly thereof at second end face 26 at the opposed end of body 12 from first end face 22 as shown in FIG. 2. Additionally, the second housing 16 includes a supply port 30, and a functional port 32, extending inwardly of the first adjacent side face of the rectangular prism, which first adjacent face extends between the first and second end faces 22, 26. Additionally, a plurality of threaded mounting holes 36*a-h* are provided on a second side face 38, which also extends from first end face 22 to second end face 26. Mounting holes 36 are used to mount the valve 10 to a bracket, panel or other mounting location.

Figure 3:
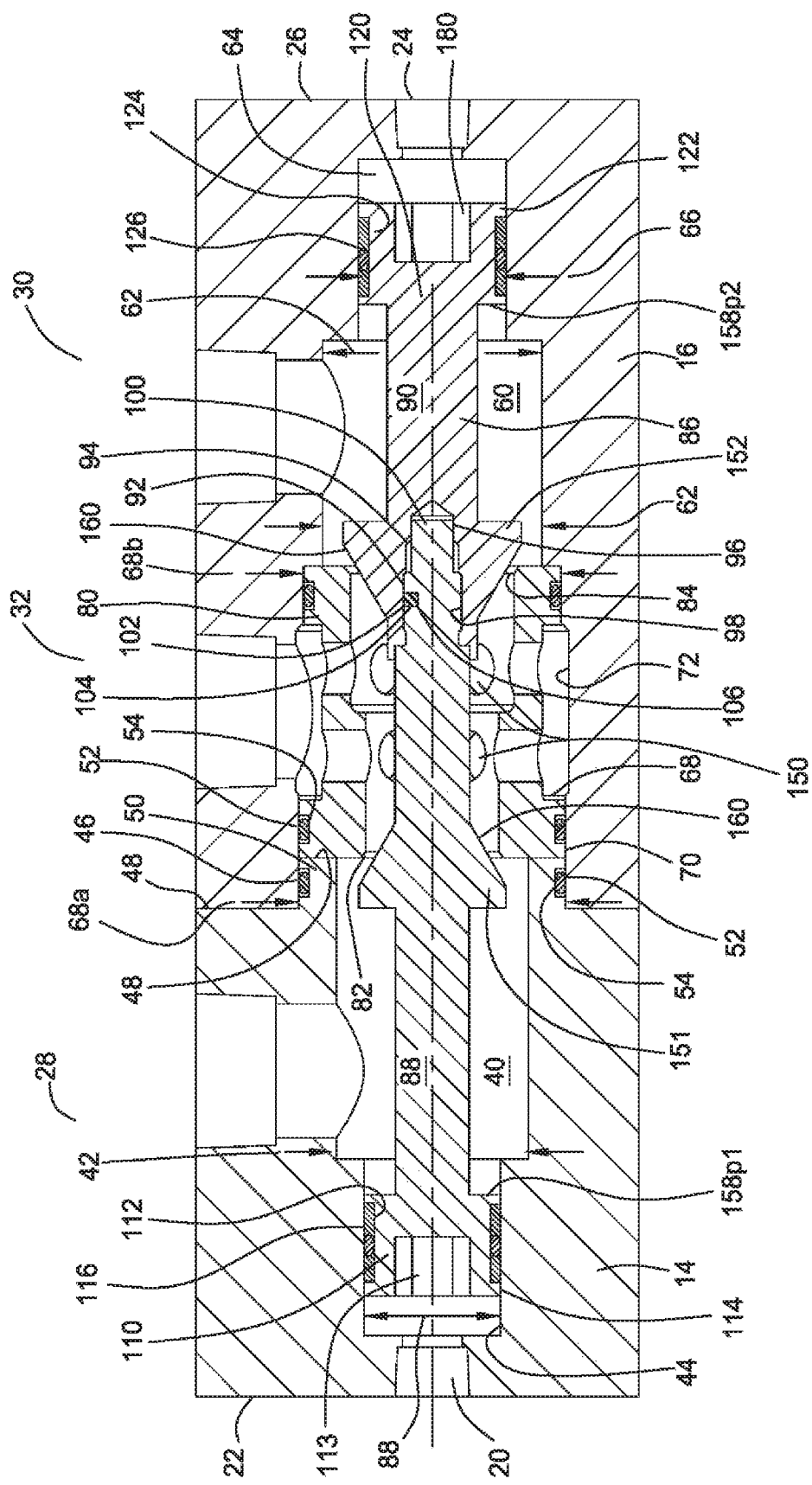
FIG. 3 is a sectional view of the valve of FIG. 1, wherein the valve is transitioning between the "ON" position and the "OFF" position.
Figure 4:
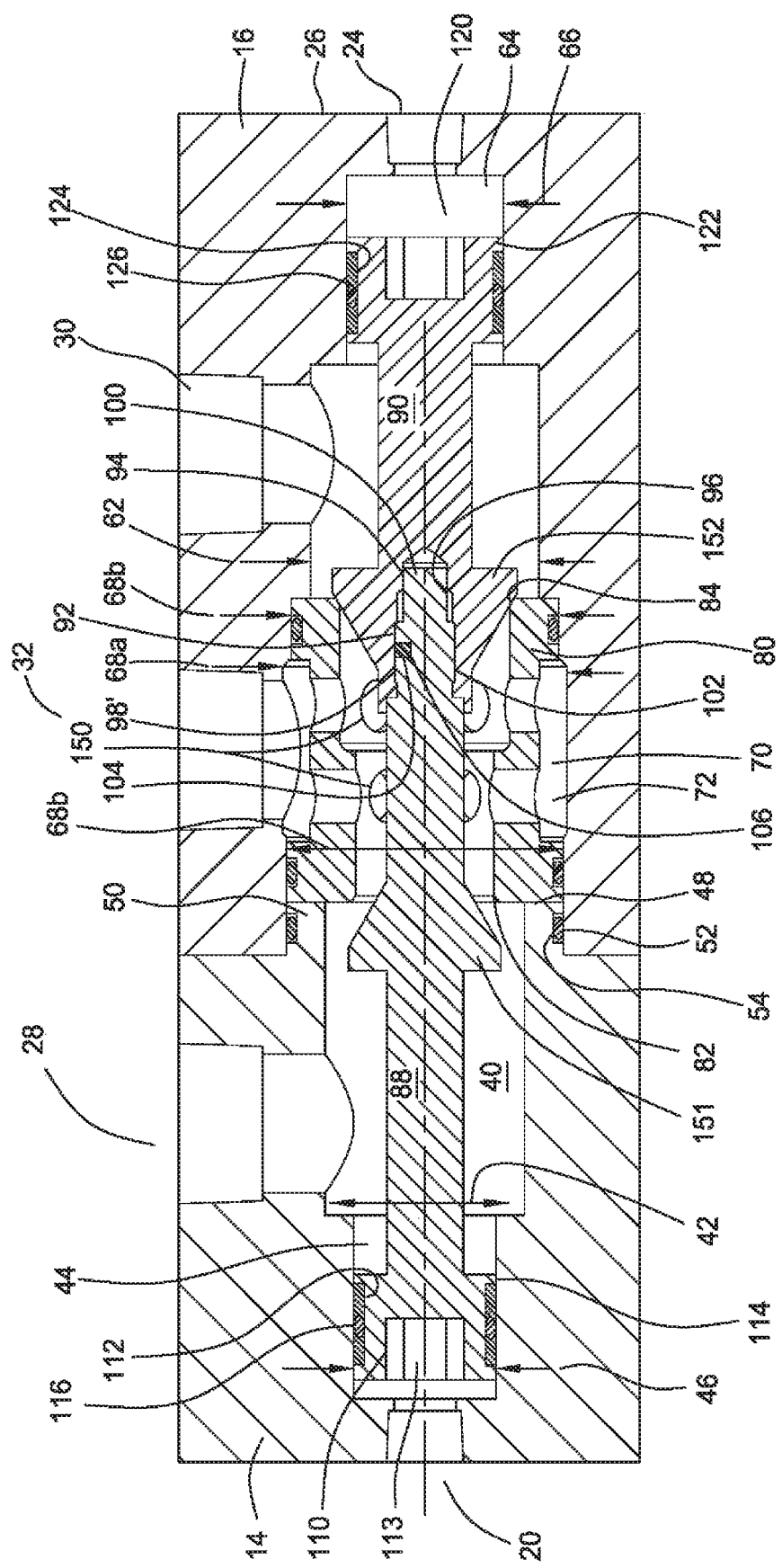
FIG. 4 is a sectional view of the valve of FIG. 1, with the valve in the "OFF" position.

Referring now to FIGS. 2 to 4, the body 12 of the valve 10 is shown in section, and the positioning of the valve poppet 86 within the valve body 12, and the configuration and selectable interconnections of the hydraulic passages through the valve 10, are shown. First housing 14 includes a first bore 40 extending therein having a first width or diameter 42 and a first pilot bore 44, having a first pilot bore diameter 46, extending generally coaxially therefrom and into communication with first inlet 20. Vent port 28 extends from the first side wall 34 into the first through bore 40 for fluid communication therebetween. First housing 14 terminates distally from first side face 22 in a wall 48, from which an annular boss 50 extends. Annular boss 50 includes a seal groove 54 on the outer annular surface thereof, within which a sealing structure 52 such as an o-ring or an o-ring between opposing backing rings is received and secured.

Second housing 16 abuts and extends from wall 48 of first housing 14, and includes a second bore 60 extending therein and having a second bore diameter 62, and from which at one end thereof extends generally coaxially therewith a second pilot bore 64 having a second pilot bore diameter 66 connecting the second through bore 60 and the second inlet 24. In the embodiment, the second pilot bore diameter 66 is greater than the first pilot bore diameter 46, and the second bore 60 has a larger diameter than first bore 40. At the opposed end of the second bore 60, a bifurcated cage bore 70 extends inwardly of the second housing wall 70 at the end of second housing 16 distal from second end wall 26 and terminates at the end wall 48 of the first housing 14. The bifurcated cage bore 70 includes a first diameter portion 68*a* bounded by opposed second diameter portions 68*b* extending inwardly of second housing 16 from the abutment thereof with first housing 14 and from the opening of the cage bore 70 into second bore 60 and having a slightly smaller diameter than that of first diameter portion 68*a*. An enlarged diameter region 72 is thus provided within cage bore 70 between first and second diameter portions 68*a, b* thereof. Supply port 30 extends from first side wall 34 into second through bore 60. Functional port 32 extends from first side wall 34 into the enlarged diameter region 72 of the cage bore 68. Vent port 28 extends from first side wall 34 into the first through bore 40. The pilot inlets 20, 24 and vent, supply and functional ports 28, 30 and 32 are configured as NPT ports, but could also be configured as code 62 connections. Also, the body 12 configured to be flange mounted or face mounted to a baseplate.

To selectively communicate the functional port 32 with one of the supply port 30 and the vent port 28, valve 10 includes an annular cage 80, having opposed frustoconical first and second sealing faces 82, 84 located at opposed ends thereof, and a two piece selection valve poppet 86 extending through, and selectively sealable against, one of the opposed frustoconical sealing faces 82, 84.

Figure 5:
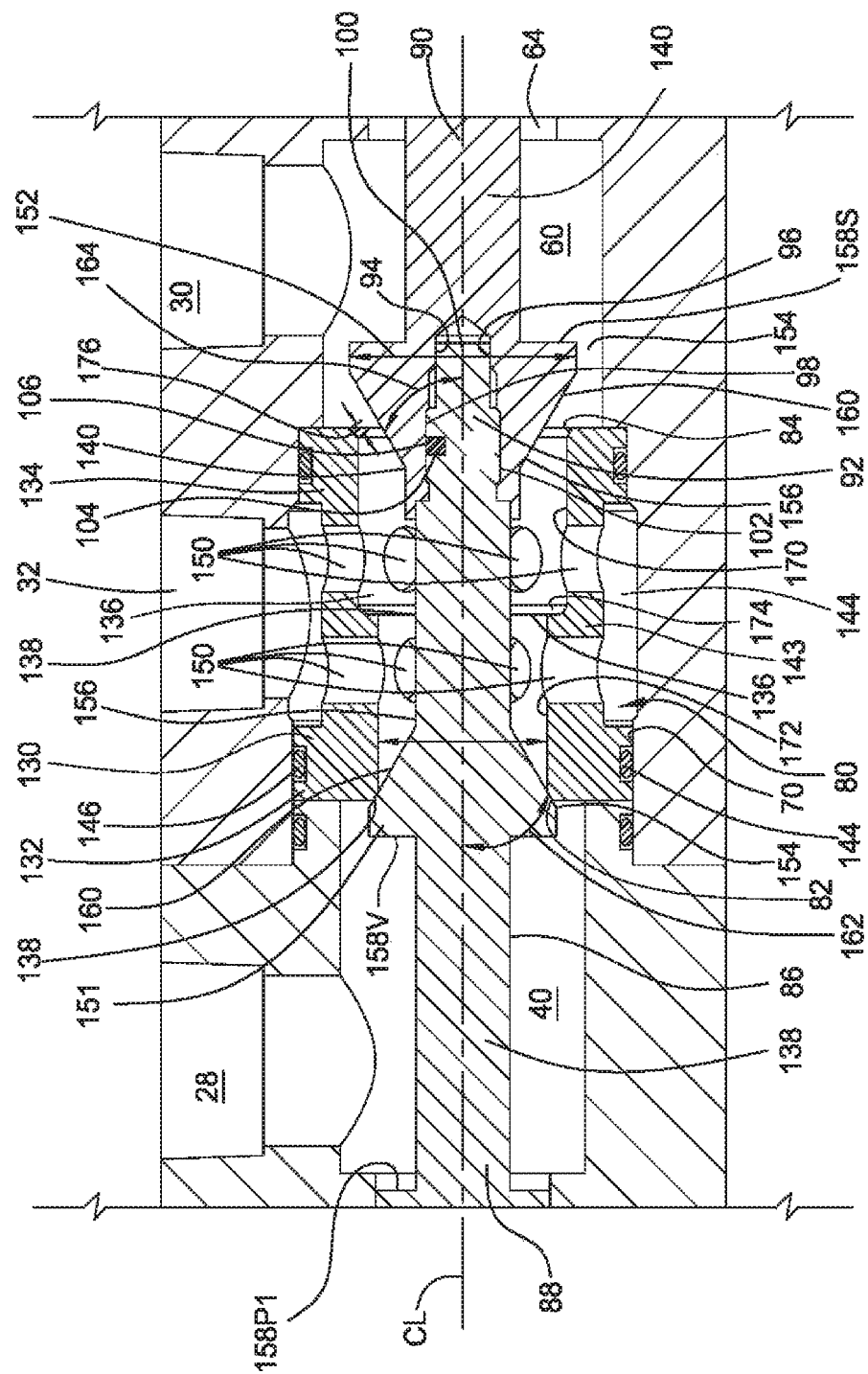
FIG. 5 is a partial enlarged sectional view of the valve of FIG. 1, showing the details of the cage and poppet of the valve.

Valve poppet 86 includes a first poppet portion 88 and a second poppet portion 90. Referring to FIG. 5, the first poppet portion 88 includes a pilot 92 and the second poppet portion 90 has a complimentary pilot bore 94 extending thereinto at the inwardly extending end thereof. Pilot bore 94 includes a generally right cylindrical guide portion 96 at the base thereof, and a threaded bore 98 between the guide portion 96 and the opening of the pilot bore 94 at the second poppet end thereof. Pilot 92 includes a generally right cylindrical stab portion 100 forming the end of the first poppet portion 88 and a threaded outer surface 102 inwardly of the end of the stab portion 100. A blind bore 104 extends inwardly of the threaded portion 102, within which a nylon or other extrudeable material plug 106 is received. Plug 106 in a free state extends into the threaded region of the first poppet 88, and may also extend outwardly beyond the threads in a free state thereof. When the first poppet 88 is threaded into the second poppet 90, the plug 106 material is extruded in the mating threads of the first poppet 88 and the second poppet 90, securing them together and preventing backing out of the first poppet 88 from the second poppet 90.

Referring again to FIGS. 2 to 5, valve poppet 86 is supported, at the opposed ends thereof, in the first and second pilot bores 44, 64. First poppet portion 88 includes, at the end thereof opposed to the pilot 92, a first poppet piston 110 having a generally right cylindrical geometric construct with a diameter slightly smaller than the first pilot bore diameter 46, having a seal groove 112 extending inwardly of the outer circumferential face 114 thereof, within which a sealing structure 116 is secured to seal the seal groove 112 base to the inner face of the first pilot bore 44. The sealing structure includes an O-ring, such as a nitride rubber O-ring, which is generally centered in the seal groove 112 by opposed back up rings, which also function as a sliding surface to engage the inner diameter of the bores 44, 64 to prevent metal to metal sliding contact between the poppet pistons 110, 120 and the bores 44, 64. A hex recess 113 is provided in the end face of the piston 110 for ease of assembly of the valve poppet 86. Similarly, at the opposite end of the second poppet portion 90 from second pilot bore 94 is provided a second poppet piston 120, having a generally right cylindrical construct with a diameter slightly smaller than the second pilot bore diameter 66, having a seal groove 124 extending inwardly of the outer circumferential face 122 thereof, within which a seal structure 126 is secured to seal the seal groove 124 base to the inner face of the second pilot bore 64. The diameter of the second pilot piston 120 is greater than that of first pilot piston 110. By selecting the pressures applied to the first and the second inlets 20, 24, the relative position of the valve poppet 86 with respect to the cage 80 is controlled as will be described further herein. Additionally, the inner diameter of the second pilot bore 64 (outer diameter of second piston 120 and sealing element 126) and the diameter of the innermost extension of the second annular sealing face 84 (radially innermost portion thereof) are different. Likewise, the inner diameter of the first pilot bore 44 (outer diameter of first piston 110 and sealing element 116) and the innermost diameter of the second annular sealing face 82 (radially innermost portion thereof) are different, as the innermost diameter of the second annular sealing face 82 exceeds the inner diameter of the first pilot bore 44 (outer diameter of first piston 120 and sealing element 116). Additionally, the innermost diameter of the first annular sealing face 82 and the inner diameter of the first pilot bore 44 (outer diameter of first piston 120 and sealing element 116) are the same, within machining tolerances.

Valve poppet 86 and cage 80 have complementary surfaces to enable sealing off of fluid communication between the functional port 32 and either of the vent port 28 or the supply port 30, and thus control the pressure and flow of fluid downstream of the valve, i.e., to a downstream component coupled to the functional port 32. Thus the cage 80, and the valve poppet 86, are provided with complimentary sealing faces. Referring to FIG. 5, cage 80 has a generally right annular sleeve or tube shaped cage body 130 having opposed annular ends 132, 134 between which extends a generally circular, in section, cage passage 136 which is surrounded by a perforated sleeve 142 extending between, and integrally formed with, the annular end faces 132, 134. A chamfered sealing face (first annular sealing face 82 or second annular sealing face 84) is provided to connect the cage passage 136 and each of the annular ends 132, 134. Thus, the vent side annular frustoconical sealing face 82 is provided inwardly adjacent the vent side annular end face 132 abutting the end of the boss 50 of the first housing 14 and extends inwardly of cage therefrom, and a supply side annular frustoconical sealing face 84 is provided extending inwardly of the cage 80 from the supply side annular end face 134. The chamfered first and second sealing annular sealing faces 82, 84 terminate inwardly of the cage 80 at the cage passage 136. The outer surface of the perforated sleeve 142 includes a recessed central portion 143 providing a circumferential passage, bounded on either side thereof by the annular ends 132, 134. On the outer circumferential surfaces of ends 132, 134, a seal groove 144, having a sealing structure 146 received therein, is provided. Each sealing structure 146 seals the base of the seal groove 144 with the cage bore 70 inner surface, and includes an O-ring and backup rings to either side of the O-ring in the seal groove 144. At the recessed central portion 143 a plurality of openings 150 extend through the perforated sleeve 142 of the cage 80 to enable fluid communication between the cage passage 136 and an annular manifold formed by the central recessed portion 143 and the enlarged diameter region 72 of the cage bore 68, into which the functional bore 32 extends. The openings 150 extend through the perforated sleeve 142 about the circumference of the recessed portion 143 at two different axial positions along the axis of the cage 80, although other layouts of the openings are possible, so long as the openings 150 provide a sufficient opening area such that the openings 150 do not create a flow limiting restriction of the valve 10.

Referring to FIG. 5, the valve poppet 86 further includes a vent side conical body 151 and shaft 138, and a supply side conical body 152 and shaft 140 integrally formed therewith. Each conical body 151, 152 includes a larger diameter end 154 and a smaller diameter end 156, wherein the smaller diameter end has the same diameter of the poppet shaft 138, 140 from which it circumferentially extends, and a continuous conical face 160 extending therebetween. The smaller diameter end 156 of vent side conical body 151 and of the vent side shaft 138 is smaller in diameter than the smaller diameter end 156 of supply side conical body 152 and supply side shaft 140. Likewise, larger diameter end 154 of vent side conical body 151 is smaller in diameter than the larger diameter end 154 of supply side conical body 152. Thus a vent side annular face 158v is formed extending outwardly from vent side shaft 138, and a supply side annular face 158s is formed extending outwardly from supply side shaft 140. Furthermore, a first poppet piston annular face 158p1 is formed on the face of first poppet piston 110 facing inwardly of the valve into the vent region, and a second poppet piston annular face 158p2 is formed on the surface of the second poppet piston 120 facing the region where the supply port 30 enters the valve 10 (FIG. 3). An angle 162 formed between the vent side annular sealing face 82 and supply side annular sealing face 84 and valve 10 centerline CL is the same as, or close to the same as, the angle 164 formed between the continuous conical face 160 and the valve 10 centerline CL. However, the diameters of the conical faces 160 of the conical bodies 150 and 152 where sealing contact is made with the annular sealing faces 82, 84 are different.

Referring still to FIG. 5, the relative tapering diameters of the conical faces 160 of the conical bodies 150, 152, annular end faces 158v, 158s, the shafts 138, 140 and pilot pistons 110, 120 and the inner diameters of the cage passage 136 are configured to enable latching of the poppet 86 to the cage 80. Cage passage 136 comprises a second diameter portion 170 opening into second through bore 60, and a first diameter portion 172 opening into first through bore 40 of first housing, and a blend region 174 therebetween generally centered along the axial length of the cage 60. Thus, the innermost diameter of the annular sealing face 84 is greater than that of the annular sealing face 82. Additionally, each of the frustoconical surfaces of the cage comprising a sealing face 82, 84 is configured to have, within tolerance limits, the same length 176, and thus the area of contact between the conical face 160 on second poppet portion 90 and the annular sealing face 84 is greater than that between conical face 160 on first poppet portion 88 and annular sealing face 82 because of the differences in the inner diameters thereof.

The geometries of the annular sealing faces 82, 84 and the conical faces 160 of the poppet 86 are such that a sealing force of the poppet 86 against the cage 80 of approximately twice the supply pressure will occur at the interface of the conical sealing face and the selected one of the annular sealing faces 82, 84, as will be described herein. Additionally, the geometry of the conical sealing faces 160 of the poppet 86 and the annular sealing faces 82, 84 of the cage 80 ensure that supply pressure firmly latches the valve in place, such as where the conical sealing face 160 of conical body 151 is latched with annular sealing face 82 of the cage 80 and the valve is maintained in an open position and isolates the vent outlet 28 from both the supply inlet 30 and functional outlet 32. As previously discussed herein, the poppet 86 position relative to the cage 80 is determined by relative pressures on opposed sides thereof, i.e., at the first and second inlets 20, 24, and by the relative sizes of opposed poppet pistons. The inlets 20, 24 only need be momentarily pressurized to position the poppet relative to sealing surfaces on the cage 80, and not to maintain the poppet in that position.

In the valve open position shown in FIG. 2, where the vent outlet 28 is isolated from the supply inlet 30 and the functional outlet 32, the area of the annular first piston wall 158p1 facing the vent side pressure is approximately the same as the effective area of the vent side annular face 158v, and hence the forces imposed by the vent side pressure on the poppet 86 is substantially balanced. Alternatively, different areas can be provided. Additionally, the effective area of the conical body 151 facing the supply pressure and tending to move the poppet 86 off of the first annular sealing face 82 is the same or smaller than supply side annular face 158P2, and thus the poppet 86 is inherently biased to close conical face 160 thereof against the first annular face 82. In particular, by selecting the annular area of the supply side annular face 158P2 relative to the innermost diameter of the annular sealing face 82, leveraging of the supply fluid pressure entering through the supply inlet 30 can be accomplished to maintain the valve closed. As a result, the bias force imposed between the first conical body and the first annular sealing face 82 is twice the supply pressure. This ensures that even with minimal pressure at the vent outlet 28, or a pressure balanced architecture on the vent side of the poppet 86 the valve remains in the open position and the vent opening 28 is isolated from the supply inlet 30 and the functional outlet 32.

To move the poppet 86 to close the valve, the second pilot inlet 24 is momentarily pressurized to move the poppet 86 to move the conical body 152 into engagement with the second annular sealing face 84. In this position, any residual pressure in the supply inlet 30 will bias the second conical body 152 against the second annular sealing face 84, to maintain the poppet 86 in position. As above there is a force due to pressure acting on the poppet 86 which is formed between the larger annular surface 158S and the smaller annular surface 158p2 which maintains the poppet 86 in position until first pilot inlet 20 is pressurized. The pressure on the second pilot inlet 24 can be, and to reduce the quantity of pressurized fluid needed to be maintained in the hydraulic control circuit that the valve is in, is removed once the conical face 160 of conical body 152 is latched against annular sealing face 84

To assemble the valve 10, the first poppet portion 88 and the second poppet portion 90 are inserted into the opposed open ends of the cage, and threaded together. The cage 80, with the sealing structures 146 in the sealing grooves 144 thereof, is then inserted into the cage bore of the second housing 16, while piston 120 with the sealing structure 126 in the groove thereof is inserted into the second pilot bore 64. The first housing 14 is then placed over the portion of the poppet 86 extending from the second housing 16, and the piston bore 122, and the annular boss 50 with the sealing structure 56 thereon, is received within the cage bore of the second housing while the first piston 110, with the sealing structure 116 thereon, is received within the first pilot bore 44. Then fasteners 18a to 18d are inserted into the holes of the first housing 14 and threaded into the threaded holes in the second housing 16, to pull and secure the first and second housings 14, 16 together. Thus, in the event any of the poppet 86, cage 80 or sealing structures needs to be replaced, the repair or servicing of the valve 10 can be done on site by disassembly thereof and replacement of any parts required to be replaced. Additionally, each of the sealing structures described herein are configured as having an o ring bounded at either side thereof by a backup ring.

The poppet 86 and cage 80 may be configured from materials which can deform under the operating pressures supplied to the pilot inlets 20, 24, such that the poppet 86 becomes "latched" into the end of the cage 80 by friction or actual stress and distortion between parts. Materials such as delrin, PEEK and other engineered plastics are specifically contemplated for the cage 80. The poppet is configured of a metal such as stainless steel.

In FIG. 3, the poppet 86 has moved from the position thereof of FIG. 2, by the application of fluid pressure to piston 120 sufficient to free the conical body 151 of the poppet 86 from the annular sealing face 82 cage 80. As the poppet 86 travels to the left in FIG. 3, all three of the vent, functional and supply ports 28, 30 and 32 will momentarily be in communication with each other, and pressurized fluid in the functional passage 32 and supply passage 30 will begin venting to the vent port 28. Then as the poppet 86 continues to move to the left, the conical face 160 of the supply side conical body 152 engages the annular sealing face 84 of the cage 80. At this point, pressure is vented in the second pilot bore 64 the supply pressure coming into the valve through the supply port causes the supply side conical body 152 to become latched into the open end of the cage 80 and seal off communication between the vent port 30 and the supply port 30, and maintain communication between the vent port 28 and the supply port 30. Absent any further change, the poppet 86 remains in the position shown in FIG. 4.

Figure 6:
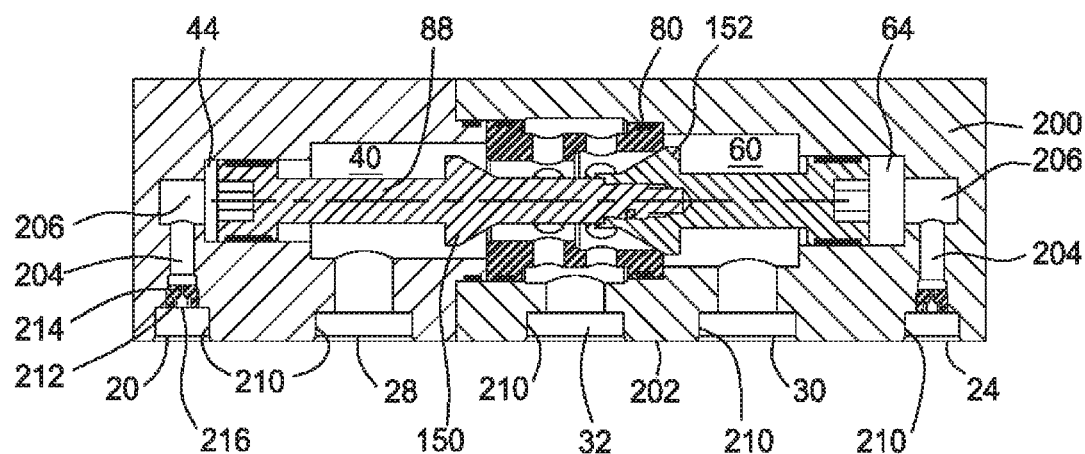
FIG. 6 is a sectional view of an alternative embodiment of the valve of FIG. 1.
Figure 7:
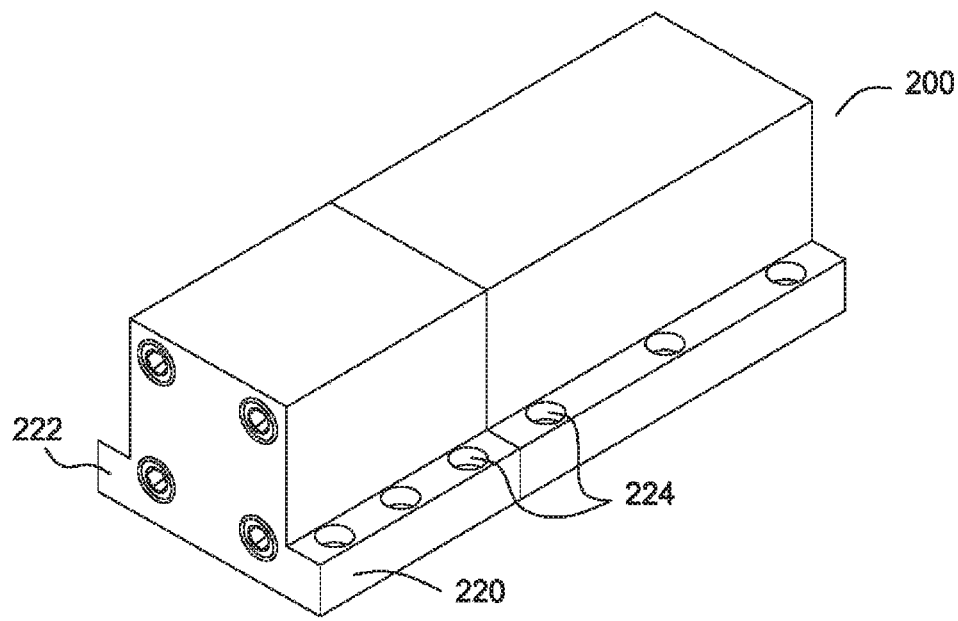
FIG. 7 is a perspective view of the alternative embodiment of the valve of FIG. 1.

Referring now to FIGS. 6 and 7, an alternative construct of valve 10 is shown in section. The valve 200 of FIGS. 6 to 8 has the same construct as the valve 10 of FIGS. 1 to 5, except as noted herein. Thus, in contrast to valve 10, valve 200 is constructed to be mounted to a subplate (not shown). Thus, the first and second pilot inlets 20, 24 are located on the same side surface 202 of the valve 200 where the vent, functional and supply ports 28, 30 and 32 are located. Each of the first and second pilot inlets 20, 24 are located on the same side surface 202 of the valve 200 where the vent, functional and supply ports 28, 30 and 32 are provided and include a counterbore 210 extending inwardly of side surface 202, into which a nipple (not shown) extending from the subplate (not shown) is sealingly received. Each of the first pilot bore 20 and second pilot bore 24 include a cross bore 204 extending from the counterbore 210 and into a feed bore 206, which opens into the first bore 40 or second bore 60. Additionally, an insert 212 having an orifice 214 therethrough is inserted into the cross bore 204. In one aspect, the insert includes a hex recess 216 extending into one side thereof, from which the orifice 214 extends. The hex recess 216 is useful to turn the insert 212 to thread the insert 212 into the cross bore 204. The orifice 214 slows the ramping and exhausting of pressure in the pilot bores 44, 64, resulting in dynamic cage seat load dampening with less rapid travel of the poppet 86 in the valve 200, and thus slower engagement between the poppet and cage 80 reducing fatigue induced wear and failure of the cage 80 and/or poppet 86. Valve 200 includes opposed fins 220, 222 which extend outwardly of opposed sides of the valve 200, and through which openings 224 extend. Fasteners (not shown) are extended through the openings 224 in the fins 220, 222 to secure the valve 200 to a sub-plate (not shown). Other than the positioning of the pilot inlets 20, 24 and the addition of the orifice 214 in the pilot fluid inlet path, the valve 200 operates the same as the valve 10, and application of pressure to one of the inlets 20, 24 causes the poppet 86 to move with respect to the cage 80, to selectively secure one of the conical bodies 150, 152 into latching engagement with the cage 80, and thereby select which bore among the vent bore 28 and the supply bore 30 is in communication with the functional bore 32

Figure 8:
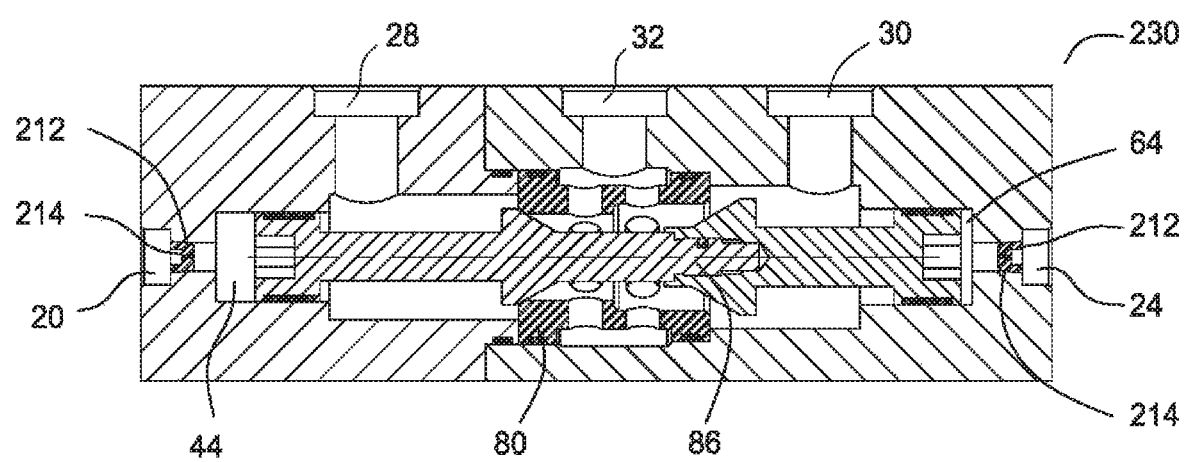
FIG. 8 is a sectional view of a further additional embodiment of the valve.

Referring now to FIG. 8, another embodiment of the valve is shown. Valve 230 is configured the same as valve 10 of FIGS. 1 to 5, except the insert 212 of the second embodiment is inserted between the inlets 20, 24 and the corresponding pilot bores 44, 64. As in the valve 200, the orifice 214 in the insert dampens the pressure spike caused by the application of pilot pressure to one of the inlets 20, 24, thereby reducing the impact velocity of the poppet 86 with the cage 80. Additionally, in this embodiment, the pilot inlets 20, 24 and vent, supply and functional ports 28, 30 and 32 are configured as code 62 ports.

As described herein, a latching poppet valve which maintains the communication and flow protocol as among the vent, supply and functional ports without the need to maintain pilot pressure in the on state is provided. The valve stem or "poppet" physically expands the inner diameter of the cage 80 when one of the conical bodies 150, 152 engages against the frustoconical sealing faces 82, 84 of the cage 80 to induce a latching stress or strain in the cage 80 tending to cause the cage 80 circumferentially grip the poppet conical body 151 or 152, latching the poppet 86 in the cage 80, or by friction between the poppet conical body 151 or 152 and its corresponding annular sealing face 82 or 94. The valve is easily assembled and serviced in the field, and by latching in an ON or OFF position, reduces the fluid pressure and fluid volume requirements for the operation thereof, resulting in lower operating costs for the end user.

Thus, there is provided to a hydraulic 3-Way 2-Position Latching Poppet Valve that:
1) is constructed of three primary parts: body, poppet and cage.
2) remains in the open position or closed position after hydraulic pilot pressure has been momentarily applied and subsequently removed
3) utilizes a poppet with different seal diameters which generates a hydraulic seating force based on supply pressure which ensures the poppet remains in last position
4) utilizes a poppet with equal seal about the vent port to ensure residual vent pressure does not affect valve function
5) the seating force generated by the different poppet seal diameters produces a seat contact stress approximately 2 times the supply pressure
6) provides flow capacity effectively equivalent to the traditional SPM valve
7) in one embodiment, shifts from open to closed, or closed to open, while utilizing two orifices, one on each pilot inlet, which restrict fluid velocity into and out of the two pilot cylinders resulting in a dynamic seat load dampening affect
8) utilizes a two piece poppet that threads together with two locating diameters and nylon lock insert, with a socket hex provided on both ends
9) utilizes a poppet that is guided at both ends of the body with double wear bands in the sealing structure thereof that also serve as o-ring backups
10) utilizes a cage that is stepped on the OD in order to prevent damage to the two sets of o-ring seals and double backups preventing metal to metal sliding contact with the body
11) is configured to be installed in-line with threaded ports, panel mounted with flanged ports or manifold mounted with integral seal subs, with or without pilot cylinder orifices
12) the pressure of a pressurized fluid in the supply passage, absent pressure in the first pilot inlet, causes the second conical surface to seal against the second frustoconical sealing face.

What is claimed is:
1. A latching valve comprising:
a body having an exterior surface, a first pilot inlet and a second pilot inlet extending into the body, and a bore therein, the bore communicable with a first passage, a second passage and a third passage;
a cage located in the bore between the first passage and the third passage, the cage including a first frustoconical sealing face and a second frustoconical sealing face; and
a poppet reciprocatably located in the bore and extending through the cage, the poppet comprising:
a first conical surface configured for selective engagement with the first frustoconical sealing face of the cage;
a second conical surface configured for selective engagement with the second frustoconical sealing face of the cage;
a shaft extending through the cage and connecting the first and second conical surfaces; and
a first piston in fluid communication with the first pilot inlet, the first piston operatively connected to the first conical surface of the poppet and fluidly isolating the first pilot inlet from the bore; and
a second piston in fluid communication with the second pilot inlet, the second piston operatively connected to the second conical surface of the poppet and fluidly isolating the second pilot inlet from the bore; wherein
a first surface area of engagement between the cage and the first enlarged surface is different than a second surface area of engagement between the cage and the second enlarged surface,
the first, second and third passages each independently extend from the exterior surface of the body to the bore,
the smallest diameter of the first frustoconical sealing face is smaller than the smallest diameter of the second frustoconical sealing face,
the first passage extends from the exterior surface of the body and into the bore at a location between the first piston and the first conical surface,
the second passage extends from the exterior surface of the body and into the bore at a location between the second piston and the second conical surface forming a fluid flow passage separate from the first passage,
the third passage extends from the exterior surface of the body and into the bore at a location between the first conical surface and the second conical surface forming a fluid flow passage separate from the first and second passages,
the area of engagement of the first frustoconical sealing face of the cage and the first conical surface of the poppet is less than the area of contact between the second frustoconical sealing face of the cage and the second conical surface of the poppet,
the first passage is a vent passage, the second passage is a pressurized fluid supply passage, and the third passage is a functional passage communicable with a device hydraulically actuated by fluid flowing through the functional passage,
the first and second pistons each have a piston diameter, and the diameter of the first piston is smaller than the diameter of the second piston, and
the pressure of a pressurized fluid in the supply passage, absent pressure in the first pilot inlet, causes the second conical surface to seal against the second frustoconical sealing face.
2. The valve of claim 1, wherein, when the second conical surface is engaged against the second frustoconical surface and the pressure of the pressurized fluid in the supply passage is removed, the poppet maintains a position wherein the vent and functional passages are in communication and the supply passage is isolated therefrom.
3. A hydraulically operated control valve comprising:
a body having a bore therein, the bore communicable with a first passage, a second passage and a third passage;
a cage located in the bore between the first passage and the third passage; and a poppet reciprocatably located in the bore and extending through the cage, the poppet comprising:
   a first enlarged surface configured for selective engagement with a first surface of the cage;
   a second enlarged surface configured for selective engagement with a second surface of the cage; and
   a shaft extending through the cage and connecting the first and second enlarged surfaces; wherein
the poppet is selectively positionable to:
latch the second enlarged surface against the second surface of the cage and thereby block fluid communication between the first bore and the second and third bores;
latch the first enlarged surface against the first cage surface and thereby block fluid communication between the third bore and the first and second bores; and
space the first enlarged surface from the first surface of the cage and simultaneously space the second enlarged surface from the second surface of the cage and thereby allow fluid communication between the first, second and third bores simultaneously, and wherein
the first and second surfaces of the cage are annular frustoconical surfaces on opposed ends of the cage, and an inner diameter of the first annular frustoconical surface of the cage is less than an inner diameter of the second annular frustoconical surface of the cage; and
a contact area of the first enlarged surface of the poppet and the first annular frustoconical surface is smaller than a contact area between the second enlarged surface and the second annular frustoconical surface; and
the poppet further comprises a poppet shaft, and the first enlarged surface comprises a first conical surface extending outwardly from the poppet shaft, and a second conical surface extending outwardly of the shaft, wherein the first and second conical faces face each other; and
the poppet is configured such that when the first conical surface is engaged with the first annular frustoconical surface of the cage, the second conical surface is spaced from the second annular frustoconical surface of the cage, and when the second conical surface is engaged with the second annular frustoconical surface of the cage, the first conical surface is spaced from the first annular frustoconical surface of the cage.

4. The valve of claim 3, wherein:
the body further includes a first inlet extending therethrough and intersecting the bore and a second inlet extending therethrough and intersecting the bore; and
the poppet shaft includes a first piston at a first end thereof extending inwardly of the first inlet, the first conical surface disposed between the first piston and the second conical surface, and a second piston at a second end thereof extending inwardly of the second inlet, the second conical surface disposed between the second piston and the first conical surface; and
each of said pistons having a diameter greater than the diameter of the shaft immediately adjacent thereto, such that a first annular piston wall is formed around the shaft at the intersection of the shaft with the first piston, the first annular piston wall facing and exposed to the bore, and a second annular piston wall is formed around the shaft at the intersection of the shaft with the second piston, the second annular piston wall facing and exposed to the bore.

5. The valve of claim 4, wherein fluid communication between the second passage and either of the first and third passages communicates through the fluid passages extending through the cylindrical wall of the cage.

6. The valve of claim 3, wherein the cage comprises a cylindrical wall including a plurality of fluid passages extending through the wall.

7. The valve of claim 3, wherein when fluid pressure is relieved in the third bore when the first conical surface is engaged with the first frustoconical surface, the first conical surface remains engaged with the first annular frustoconical surface.

8. The valve of claim 3, wherein when fluid pressure is relieved in the third bore when the second conical surface is engaged with the second frustoconical surface, the second conical surface remains engaged with the second annular frustoconical surface.

9. The valve of claim 3, wherein the poppet is stainless steel and the cage is plastic.

10. A latching valve comprising:
a body having an exterior surface, a first pilot inlet and a second pilot inlet extending into the body, and a bore therein, the bore communicable with a first passage, a second passage and a third passage;
a cage located in the bore between the first passage and the third passage, the cage including a first frustoconical sealing face and a second frustoconical sealing face; and
a poppet reciprocatably located in the bore and extending through the cage, the poppet comprising:
   a first conical surface configured for selective engagement with the first frustoconical sealing face of the cage;
   a second conical surface configured for selective engagement with the second frustoconical sealing face of the cage;
   a shaft extending through the cage and connecting the first and second enlarged conical surfaces; and
   a first piston in fluid communication with the first pilot inlet, the first piston operatively connected to the first conical surface of the poppet and fluidly isolating the first pilot inlet from the bore; and
   a second piston in fluid communication with the second pilot inlet, the second piston operatively connected to the second conical surface of the poppet and fluidly isolating the second pilot inlet from the bore; wherein
a first surface area of engagement between the cage and the first enlarged surface is different than a second surface area of engagement between the cage and the second enlarged surface,
the first, second and third passages each independently extend from the exterior surface of the body to the bore, and
the pressure of a pressurized fluid in the supply passage, absent pressure in the first pilot inlet, causes the second conical surface to seal against the second frustoconical sealing face.

11. The valve of claim 10, wherein a smallest diameter of the frustoconical first sealing face is smaller than a smallest diameter of the frustoconical second sealing face.

12. The valve of claim 10, wherein:
the first passage extends from the exterior surface of the body and into the bore at a location between the first piston and the first enlarged surface;
the second passage extends from the exterior surface of the body and into the bore at a location between the second piston and the second enlarged surface forming a fluid flow passage separate from the first passage; and
the third passage extends from the exterior surface of the body and into the bore at a location between the first enlarged surface and the second enlarged surface forming a fluid flow passage separate from the first and second passages.

13. The valve of claim 10, where an area of engagement of the frustoconical first sealing face and the first conical surface of the poppet is less than an area of contact between the frustoconical second sealing face and the second conical surface of the poppet.

14. The valve of claim 10, wherein the first passage is a vent passage, the second passage is a pressurized fluid supply passage, and the third passage is a functional passage communicable with a device hydraulically actuated by fluid flowing through the functional passage.

15. The valve of claim 10, wherein the first and second pistons have a piston diameter, and the diameter of the first piston is smaller than the diameter of the second piston.

* * * * *